Aug. 2, 1960   D. SCIAKY   2,947,848
METHOD AND APPARATUS FOR TRUSS CORE SANDWICH WELDING
Filed Aug. 11, 1958   5 Sheets-Sheet 1
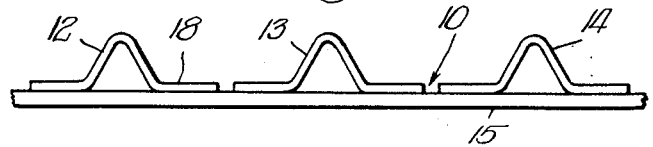
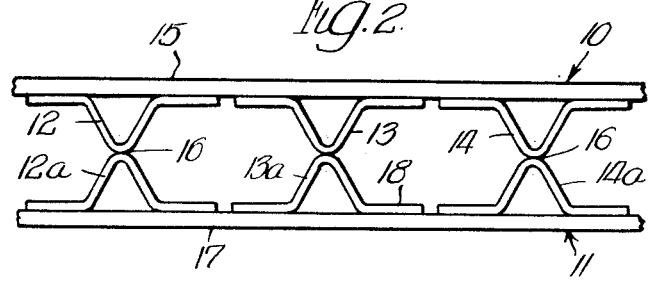
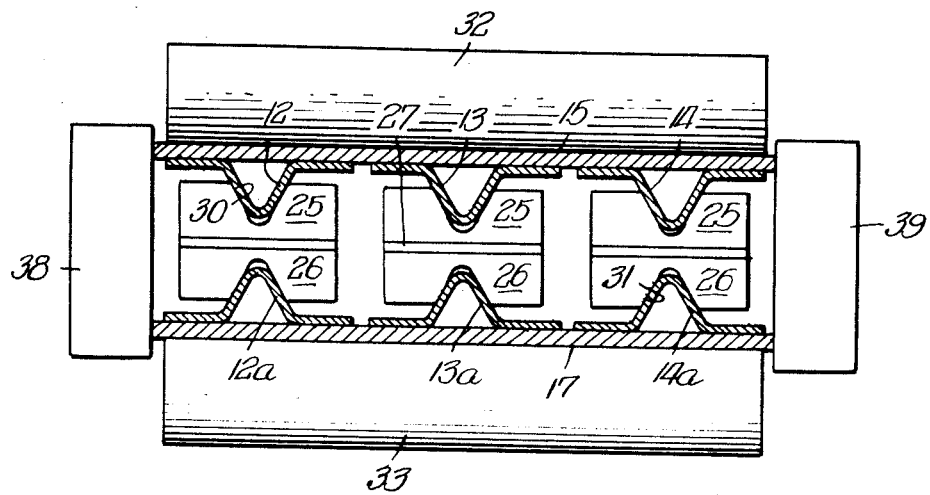
INVENTOR.
David Sciaky,
BY
Byron Hume Groen & Clement
Attys.

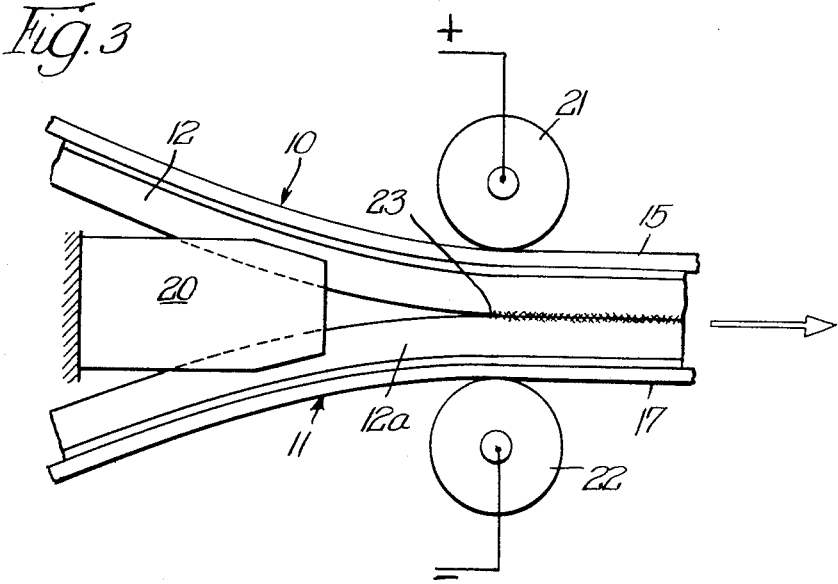
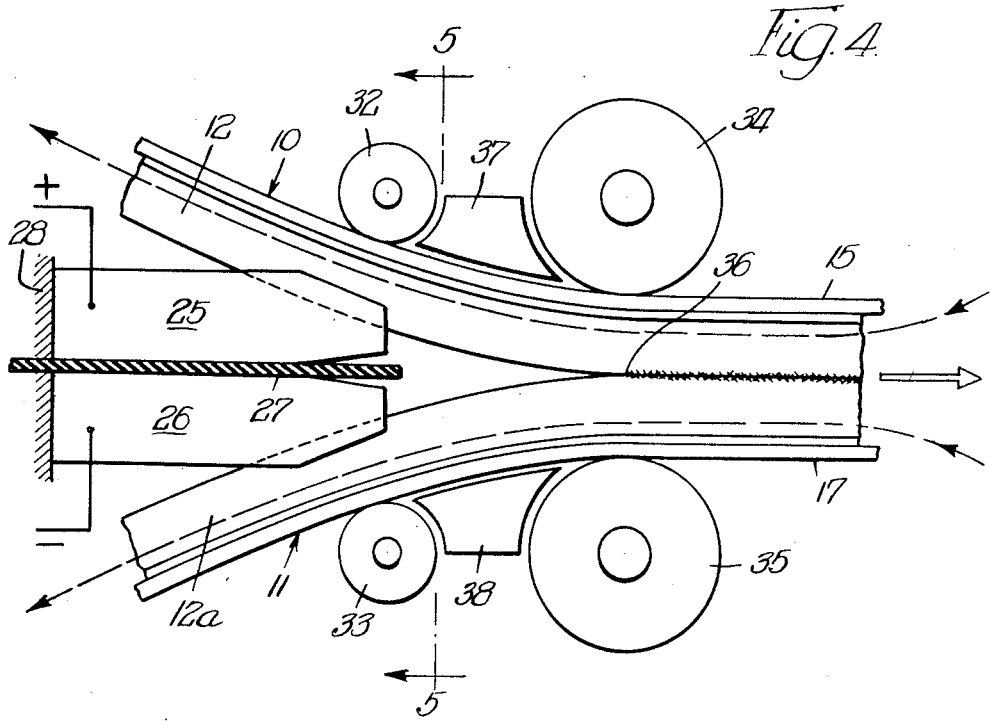

Aug. 2, 1960   D. SCIAKY   2,947,848
METHOD AND APPARATUS FOR TRUSS CORE SANDWICH WELDING
Filed Aug. 11, 1958   5 Sheets-Sheet 3
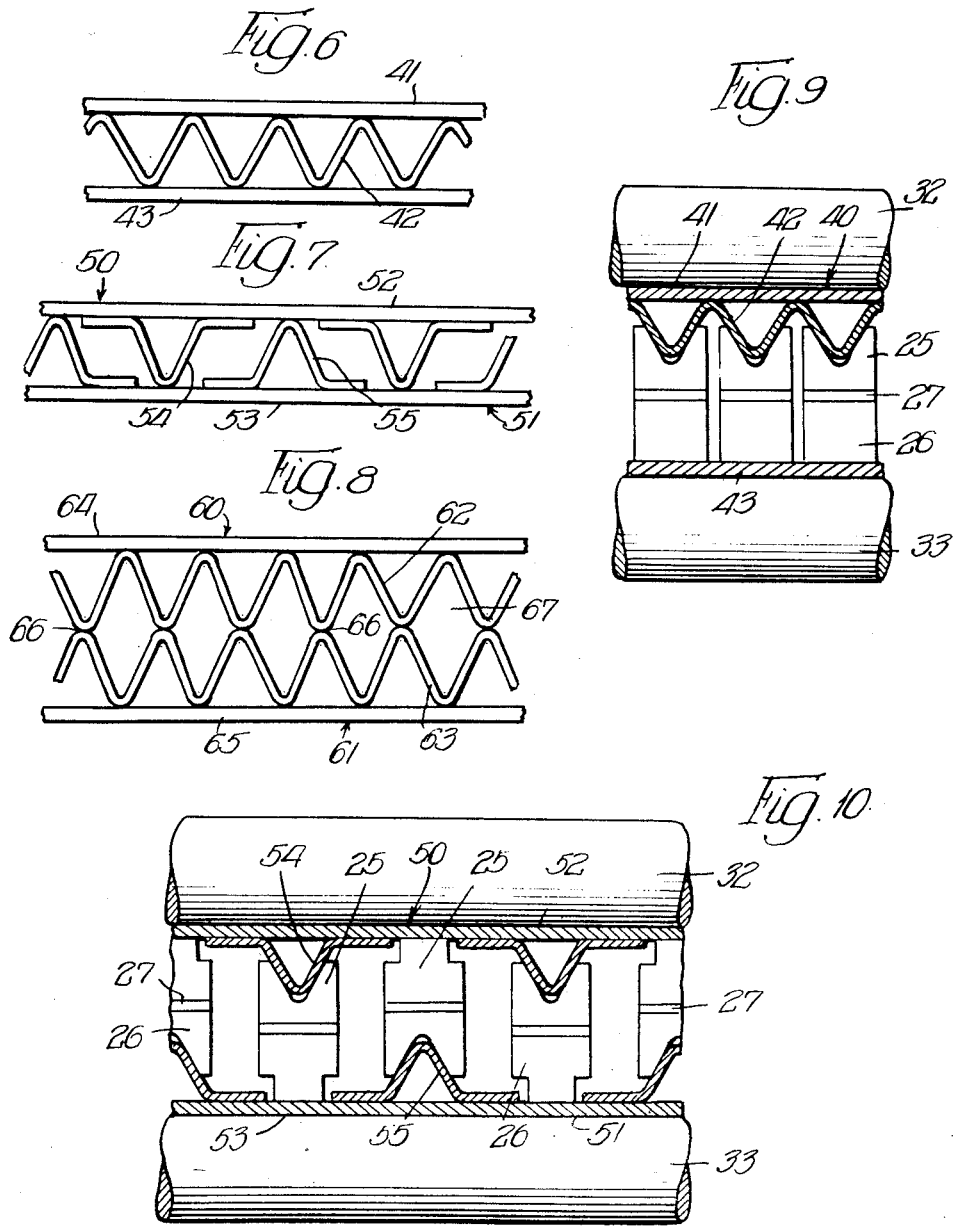
INVENTOR.
David Sciaky,
BY
Byron, Hume, Groen & Clement
ATTYS Aug. 2, 1960

D. SCIAKY 2,947,848

METHOD AND APPARATUS FOR TRUSS CORE SANDWICH WELDING

Filed Aug. 11, 1958

INVENTOR.
David Sciaky,
BY
Byron Hume Green & Clement

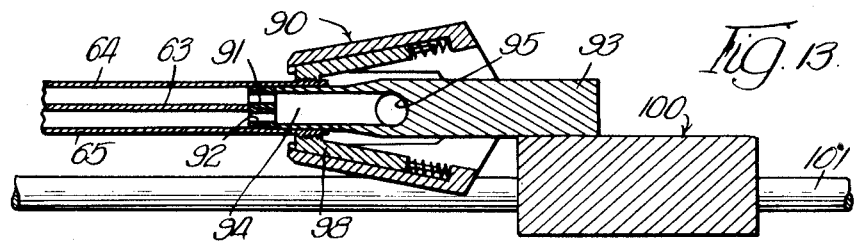
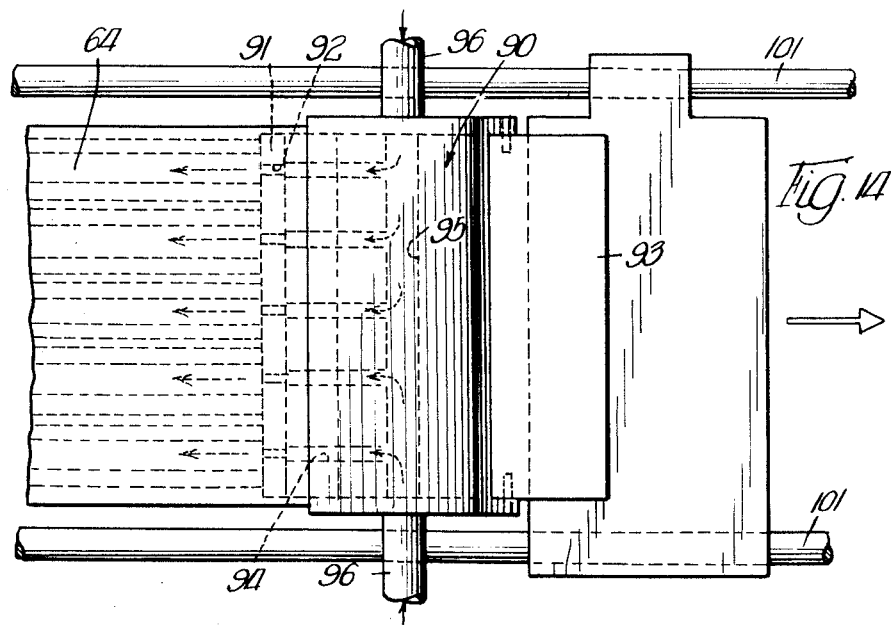
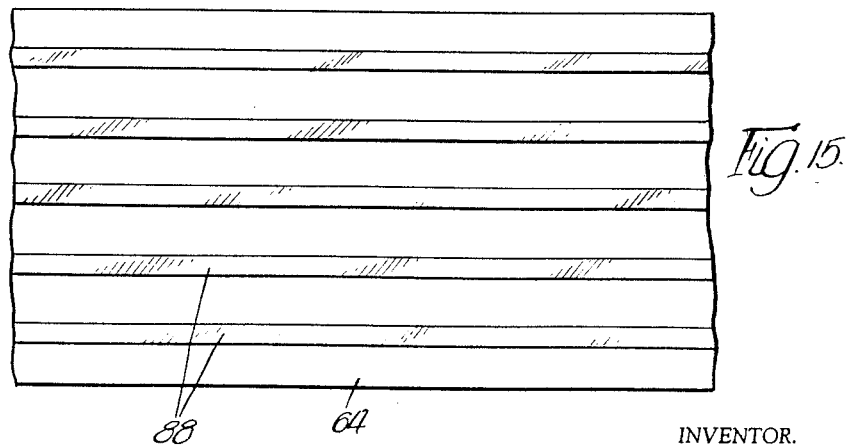

United States Patent Office 2,947,848
Patented Aug. 2, 1960

2,947,848

METHOD AND APPARATUS FOR TRUSS CORE SANDWICH WELDING

David Sciaky, Chicago, Ill., assignor to Welding Research, Inc., Chicago, Ill., a corporation of Illinois Filed Aug. 11, 1958, Ser. No. 754,388

9 Claims. (Cl. 219—83)

The invention relates to the welding of laminated structural elements and has reference in particular to a novel method and apparatus for welding structural elements of the truss core sandwich type.

The invention has special application to those laminated structural elements which consist of a central core having outer facings or cover sheets welded thereto and located top and bottom of the core. When the central core is oriented normal to the cover sheets, the structural panel is referred to as of the honeycomb core type, and when the core members are oriented parallel to the plane of the cover sheets, the structural panel is referred to as the truss core type. As regards this latter category, the core members may be either continuous or spaced and both constructions may include either a single core or a double core member. The welding of the truss-core panels presents serious problems, which, however, are mostly mechanical and due largely to the fact that the commercial panels of interest may have a thickness of less than one-half inch and a length of ten feet or more. For the welding electrode to operate inside the panel it must therefore have relatively small size. Also the depth at which it must operate is considerable and so is the pressure which the electrode must sustain without dimensional change. Contributing to the mechanical problem is the heat generated in the electrode by the welding current, which must be readily dissipated if any number of welds are to be made in succession.

Accordingly the invention has for its primary object to provide a method of fabricating structural panels of the truss core sandwich type, based on new and novel resistance welding techniques which effectively solves the mechanical problems of the electrodes, and which will be equally efficient in producing panels wherein the core members are either continuous or spaced, or incorporate either a single or a double core member.

A more specific object is to provide a method of fabricating panels of the truss core type wherein the first welding step will consist in welding the core members to their respective cover sheets and wherein the second and final welding operations will consist in welding together the core member-cover sheet assemblies to produce the complete panel.

Another object is to provide a welding method especially adapted to the welding of truss core panels and wherein adequate cooling of the assemblies is obtained by flowing a cooling fluid through each assembly in a direction opposite to their direction of movement through the welder.

Another object of the invention is to provide apparatus for welding the core member-cover sheet assemblies to each other and which will not place any restriction on electrode design other than that dictated by the welding requirements, which will thereby weld under the best operating conditions, and which will produce welded joints of the highest quality with an exterior surface of maximum smoothness.

A further object is to provide welding apparatus for the purposes described which will operate in a manner to produce a continuous weld at the nodes of the core members as they are caused to contact each other, wherein the welding current is introduced into the core members without surface deterioration or distortion, wherein the pressure for creating an effective contact between the electrode and the workpiece can be entirely adequate to reduce contact resistance to a minimum, and wherein the said electrode pressure is independent of the pressure applied to bring about the welding operation.

Another object resides in the provision of welding apparatus characterized by having electrodes which are constructed and arranged to supply the secondary welding current to the side walls of the core members and in advance of their point of welding contact, and wherein two electrodes are employed for each pair of core members, so that the current can be maintained equal for all the nodes to be simultaneously welded.

With these and various other objects in view, the invention may consist of certain novel features of construction and operation, as will be more fully described and particularly pointed out in the specification, drawings and claims appended thereto.

In the drawings which illustrate embodiments of the invention, and wherein like reference characters are used to designate like parts—

Figure 1 is a transverse sectional view showing a core-member-cover plate assembly wherein the core elements are spaced;

Figure 2 is a transverse view of a truss core panel which is made by welding together a pair of assemblies as shown in Figure 1;

Figure 3 is a side elevational view of welding apparatus employing a spacer and roller-type electrodes;

Figure 4 is a side elevational view of improved welding apparatus which operates in accordance with the method of the present invention;

Figure 5 is a vertical sectional view taken substantially along line 5—5 of Figure 4;

Figure 6 is a sectional view showing a truss core panel wherein the core member is continuous and of single element construction;

Figure 7 is a sectional view showing a truss core panel composed of spaced core members also of the single element type;

Figure 8 is a sectional view showing a continuous double element truss core panel;

Figure 9 is a vertical sectional view similar to Figure 5 but illustrating modifications in the electrode structure for accommodating the continuous core member of Figure 6;

Figure 10 is a vertical sectional view also similar to Figure 5 but illustrating modifications required in the electrode structure for welding the spaced single element truss core panel of Figure 7;

Figure 13 is a longitudinal sectional view illustrating the traction clamp for gripping the panel structures and for introducing the cooling fluid;

Figure 14 is a top plan view of the traction clamp of Figure 13; and

Figure 15 is a top plan view of a truss core panel illustrating the manner of providing strips of conductive material such as copper on the outer surface of a cover sheet.

Figure 11:
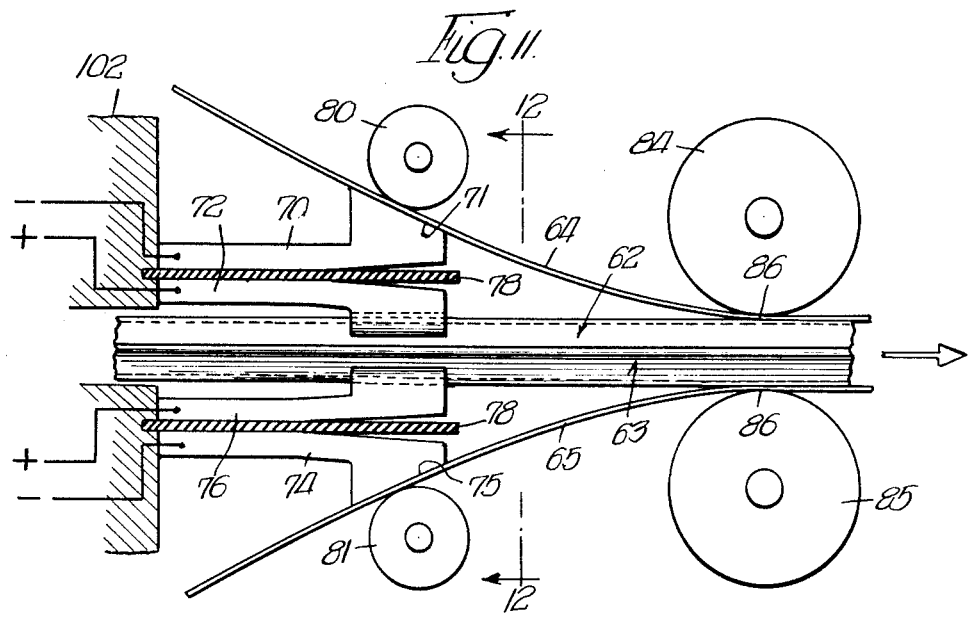
Figure 11 is a side elevational view showing a modified form of truss core welding apparatus coming within the invention.
Figure 12:
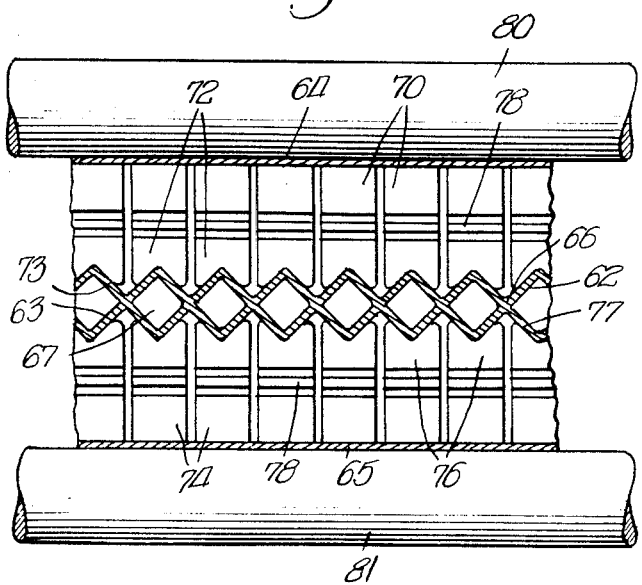
Figure 12 is a vertical sectional view taken substantially along line 12—12 of Figure 11.

Referring to the drawings and particularly to Figure 1, it will be noted that the core member-cover assembly 10 consists of core members 12, 13, 14, etc., and a facing or cover sheet 15. To form a complete truss core sandwich two such assemblies, namely, 10 and 11, Figure 2, are welded together at the nodes 16 of the core members and thus the complete panel consists of core members 12, 13, 14, etc., and a top cover sheet 15 and core members 12a, 13a, 14a, etc., and a bottom cover sheet 17. The joining of the core members to the cover sheets can be accomplished by welding the flanges 18 of the members to the said cover sheets and spot or seam welding may be employed. The core members are arranged on their cover sheet on a fixed spacing, as shown in said figures, and the welding operation can be conveniently performed without restriction on electrode design other than that dictated by welding requirements. This is an important feature of the present method since it permits welding under the best operating conditions with the production of the highest quality joints. Equally important, especially where the facing is to be an aerodynamic surface, an exterior surface of maximum smoothness is assured.

By reference to Figure 2, it will be seen that if the two assemblies 10 and 11 are placed together that line contact will be made at the nodes of the core members throughout the length of the panel. However, the establishment of uniform current and pressure density for the length of the panel would be extremely difficult, if at all possible, so that the creation of uniform welding results would also be difficult. However, this problem is solved in part by the welding apparatus of Figure 3, which permits only a certain limited contact to develop between the core members prior to welding. The spacer 20 is employed to maintain the assemblies such as 10 and 11 separated until contact is made at the nodes a short distance beyond the spacer. At this location two roller-type electrodes 21 and 22 are employed to establish a point of tangent contact 23 at which the weld is created.

The welding apparatus of Figure 3 is deficient in two important aspects. The force required to introduce the current to the cover sheets without surface expulsion is of such magnitude that collapse of the core members would result, and, further, there will be an excessive amount of current shunted through the already completed weld. It will be understood that the pressure applied by the roller-type electrodes must be of such magnitude as to develop the required quality of weld and, secondly, the pressure must be of such magnitude that for the current density involved the welding current can be introduced into the facing sheet without surface deterioration and distortion. Because of the limited contact area developed between the roller-type electrodes and the cover sheets, the current density is high. Although the heating effect at the cover sheets can be minimized by the use of high pressure to reduce the magnitude of the contact resistance, the pressure required to accomplish this is much greater than that required to develop the weld quality. Therefore the two functions can be most effectively executed if they are accomplished independently.

The welding apparatus of Figure 4 employs new and improved welding techniques to overcome the mechanical problems of the electrodes, and which in addition solves the cover sheet distortion problem and the current shunting problem by introducing the secondary welding current directly into the core members in advance of their point of welding contact. The core member-cover sheet assemblies, such as 10 and 11, are moved at a controlled rate in a right hand direction into contact with a pair of stationary electrodes, the numeral 25 indicating the top electrode and 26 the bottom electrode. Said electrodes are suitably insulated by the member 27 and insulated supports such as 28 support the electrodes in a forward extending position so that convenient surface contact can be made with the side walls of the core members, respectively. As best shown in Figure 5, two electrodes are provided for each pair of core members so that the current can be maintained equal for all the nodes to be simultaneously welded. Accordingly, each top electrode has a groove 30 formed in its top surface for accommodating the core members 12, 13 and 14, respectively. Each bottom electrode has a similar groove 31 for accommodating the respective core members 12a, 13a and 14a. Contact pressure between the electrodes is obtained by reaction forces produced by the flexible electrodes against the adjustable fixed idler rollers 32 and 33. The design of the electrodes is such that their deflection by the fixed idler rollers develops the required contact pressure. When the assemblies are removed from the welder the top electrode 25 will move upwardly toward idler roller 32, due to its inherent resiliency and in a similar manner bottom electrode 26 will move downwardly toward idler roller 33.

The panel is moved through the welder of Figure 4 by traction means at the output end of the machine. Welding pressure at the nodes of the core members is effected by the idler rollers 34 and 35, which apply a force to the assemblies sufficient to cause the nodes of the core members to contact as at 36, the magnitude of the same being entirely adequate to develop good weld qualities. Impedance blocks, identified by numerals 37 and 38, are preferably located between the idler rollers 32, 34 and 33, 35, respectively. Their function is to reduce current flow in the facing sheets and in particular to reduce shunting of the secondary current between the core members. For conventional power supply frequencies of twenty-five to sixty cycles and for medium frequencies up to ten thousand cycles, the impedance blocks are made of soft silicon iron. High frequencies may be desirable to cause the welding current to flow primarily along the nodes of the core members. In this case the impedance blocks should be made of copper to be more effective. Provision can be made for the flow of internal cooling water through the blocks and for the discharge of spray cooling water onto the cover sheets of the respective assemblies.

It should be noted that an important feature of the operation is that cooling water flows in the closed channels formed by the core members and cover sheets of the assemblies. The effect of this cooling water is to limit the temperature rise in the panel and particularly in the side walls of the core members, thus preventing loss of structural strength and consequent deformation by the forces applied to the assemblies by the idler rollers 34 and 35. Since the current for welding the nodes of the core members is conducted by the side walls of the core members, it will be appreciated that the density of the current flowing in the two side walls is unusually high. Although part of the current will be conducted by the two flanges of the core member and even by the core sheet of the assembly, nevertheless over half of the current is carried by the two side walls. Due to the high resistivity of the material used for the core members, as, for instance, stainless steel, which is approximately fifty times more resistive than copper, an exceedingly high temperature is produced such as would tend to melt the core members almost instantaneously, were it not for the flow of cooling fluid through the core members, and which is caused to flow in a direction opposite to the travel of the panel through the welder. Also the conduction of the current from the electrodes into the side walls of the core members is susceptible of producing a very undesirable heating effect. The fact that the two side walls of each core member are directly water cooled assists in producing a practical welding method for the fabrication of core member-cover sheet assemblies of the character illustrated.

For operating the welder of Figures 4 and 5, the rollers 32, 33, 34 and 35 are retracted and the assemblies 10 and 11 are inserted in the welder a sufficient distance beyond the rollers 34 and 35 such that attachment of the traction mechanism, Figure 13, can be effected. Guide rollers 38 and 39 are then adjusted for the particular width of the panel to be welded. The pressure rollers are then relocated in their operative position to apply the necessary pressures at the electrodes and at the welding contact, respectively. Water flow through the closed channels is initiated by connecting the forward end of the assemblies to a source of high pressure water. Upon energization of the traction means and movement of the assemblies through the welder, the welding current is applied and welding of the nodes at 36 begins. Welding continues until the end of the assemblies reaches a location just immediately prior to the rollers 32 and 33.

The welding of other types of truss core sandwich panels is the same as regards the method employed and the apparatus is basically the same except for the electrodes which are modified to accommodate the particular core elements. For example, the single element continuous core panel of Figure 6 requires the same type of top electrode 25, see Figure 9, as employed in the welder of Figure 4. However, the bottom electrode 26 differs somewhat since the groove is eliminated. The assembly 40, consisting of the top cover sheet 41 and the corrugated core member 42 are first welded together and then the final welding of the bottom cover sheet 43 is done by welding apparatus in accordance with the method of the invention.

Figure 7 illustrates a sandwich panel of the single element spaced-core type wherein the assemblies 50 and 51 are first fabricated and then the two assemblies are welded together by the apparatus illustrated in the sectional view of Figure 10. The top cover sheet 52 and the bottom cover sheet 53 are combined with core members 54 and 55, which alternate as shown when the panel is completed. Accordingly, it is required that the electrodes have grooves therein which alternate in a like manner and the said alternating top and bottom electrodes 25 and 26 are clearly illustrated in Figure 10.

Figure 8 illustrates a continuous core sandwich panel of the double element type. In this structural element the two assemblies 60 and 61 are formed by the welding of a continuous corrugated core member such as 62 and 63, respectively, to the top cover sheet 64 and to the bottom cover sheet 65. Following this operation the assemblies are substantially the same as the assemblies referred to in connection with the welding apparatus of Figure 4. The welding of the assemblies together, with actual welding taking place at the nodes of the corrugated core members, is effected by welding apparatus substantially similar to that shown in Figure 9, with the exception that the bottom electrodes 26 are modified by having grooves formed therein in all respects similar to the top electrodes 25.

The modified form of truss core welding apparatus shown in Figure 11 is designed for welding a double core structure to top and bottom cover sheets. The double core structure may take the form as illustrated in Figure 8, wherein the corrugated core member 62 and the corrugated core member 63 are first welded to each other at the nodes 66. As a result of this welding operation it will be understood that channels 67 are formed and which are open only at the respective ends of the core structure. For simultaneous welding of the double core assembly to the top and bottom cover sheets 64 and 65, the apparatus of Figure 11 provides a pair of electrodes for each core member and its associated cover sheet. The one pair of electrodes includes an electrode 70 having a surface 71 in contact with the cover sheet 64 and an electrode 72 having a surface 73 in contact with the core member 62. The other pair includes an electrode 74 having a surface 75 in contact with the cover sheet 65 and an electrode 76 having a surface 77 in contact with the core member 63. The pairs of electrodes are insulated by the members 78 and mechanically supported by the non-conductive members 102. The design of the electrodes 72 and 76 is such that their inherent deflection is inwardly toward each other to thus maintain proper contact pressure on their respective core members. The welding current supplied thereto has the same polarity since in this dual operation the core assembly acts as a common conductor of current. Contact pressure between the cover sheets and their respective electrodes 70 and 74 is maintained by the idler rollers 80 and 81. Also as regards electrodes 70 and 74, the welding current supplied thereto is of the same polarity.

The panel is moved through the welder by a traction member at the output end of the machine and welding pressure is effected by the idler rollers 84 and 85. Welding current therefore flows through the components of the panel structure from the electrodes to their welding contact points 86, and at said points the magnitude of the pressure is entirely adequate to develop good weld qualities. Accordingly, the cover sheets are welded to the double core member at the nodes of the said core member. During the welding operation a cooling fluid is sprayed on the cover sheets between the idler rollers 80, 84 and between the idler rollers 81, 85 and a cooling fluid is also caused to flow in the closed channels of the core structure.

In the type of welding wherein two cover sheets are welded to a core assembly and also in the case wherein two core member-cover sheet assemblies are welded together to form a truss core panel, equal distribution of the welding current is required to insure uniform welding results. To this effect the outer surface of the cover sheets is provided with thin strips of conductive material, such as copper. Figure 15 shows a cover sheet such as 64 which has been provided with a plurality of conductive strips 88. The discrete and separate strips 88 extend for the length of the cover sheet and their spacing is such that each strip is associated with a weld. The higher conductivity paths provided by these strips serve to channel the welding current and thereby promote more equal current distribution. The addition of high conductivity strips to the cover sheet has another desirable effect in that it results in a decrease in resistance of the section through which welding current flows and thus also decreases the power required for welding.

The dual purpose clamp 90, as shown in Figure 13, makes it possible for the panel to be firmly attached to the traction means and for the cooling fluid to be conveniently admitted to the closed channels which extend longitudinally of the panel. At the forward end of the panel it will be seen that the top and bottom sheets 64 and 65 project beyond the core structure and the first step in attaching the dual purpose clamp is to place a resilient pad 91 of rubber or the like within the space between the said cover sheets and into contact with the core structure. The pad is provided with openings 92 which are so disposed as to align with the channels 67. The center member 93 of the clamp 90 is then inserted between the cover sheets and into contact with the resilient pad 91. Discharge openings 94 are provided by the center member, the same having communicating relation with the transverse passage 95 and being longitudinally aligned with the openings 92 in the pad. The cooling fluid is supplied to the passage 95 by the flexible pipes 96 having connection at both ends with the passage. The self-aligning jaws 98 of clamp 90 are then actuated into gripping contact with the top and bottom sheets of the panel and the panel is firmly gripped thereby since each sheet is located and confined between a gripping jaw 98 and a wall of the center member 93. The clamp not only retains the panel but assures a sealing action between the resilient pad and the core assembly so that the cooling fluid is supplied only to the channels. The clamp is preferably mounted on a guided carriage 100 adapted to have movement on the rails 101 and said carriage is in turn suitably connected to traction mechanism for causing movement of the panel structure through the welding apparatus.

The invention is not to be limited to or by details of construction of the particular embodiment thereof illustrated by the drawings as various other forms of the

What is claimed is:

1. In a method for the resistance welding of two workpieces to each other, the said workpieces incorporating closed channels extending the length of the same, the steps which consist in maintaining the workpieces separated at a location in advance of their welding contact point, applying pressure to the workpieces at their welding contact point to cause them to contact each other, supplying a welding current to one workpiece at the location of separation in a manner to cause the current to flow in said one workpiece to the point where they contact each other and then return by flowing in the other workpiece to said location of separation, moving the workpieces at a desired rate to progressively weld the workpieces together at the welding contact point, and flowing a cooling fluid through the closed channels during the welding operation in a direction opposite to the movement of the workpieces.

2. A method of fabricating a panel of the truss core type characterized by separate components at least one of which is a sub-assembly having a closed channel extending for the length of the sub-assembly, the steps which include supplying a welding current to the components while maintaining the same separated at said current supplying location, applying welding pressure to the components at a location beyond the current supplying location to bring and maintain the components in contact for welding, and flowing a coolant through the closed channel of the sub-assembly during the welding operation in a direction opposite to the movement of the sub-assembly, whereby the components function as conductors in conducting the welding current from the current supplying location to the welding location and whereby the closed channel of the sub-assembly functions as a conductor for the coolant.

3. In the welding of truss core sandwich panels of the type including core members having a cover sheet located top and bottom and wherein the core members are approximately triangular in cross section, the method which consists in welding a core member at its base to its cover sheet to form a core-cover sheet assembly with the core member providing a closed channel with the sheet, and then welding the assemblies together by welding the nodes of one core member to the cover sheet of the other, the latter welding operation including the steps of maintaining the assemblies separated at a location in advance of their welding contact point, applying pressure to the assemblies at their welding contact point to cause the nodes of one core member to contact the cover sheet of the other, supplying a welding current to the assemblies at the location of separation in a manner to cause the current to flow in one assembly to the point of contact and then return by flowing in the other assembly to said location of separation, moving the assemblies at a desired rate to progressively weld the core members to their cover sheets at the welding contact point, and flowing a cooling liquid through the closed channel of each assembly during the welding operation.

4. In the welding of truss core sandwich panels of the type including a pair of core members having a cover sheet located top and bottom and wherein the core members are approximately triangular in cross section, the method which consists in welding each core member at its base to its cover sheet to form a core-cover sheet assembly with the core member providing a closed channel with the sheet, and then welding the assemblies together by welding the nodes of the core members to each other, the latter welding operation including the steps of positioning the assemblies with the nodes directed toward each other and in alignment, maintaining the assemblies separated at a location in advance of their welding contact point, applying pressure to the assemblies at their welding contact point to cause the nodes thereof to contact, supplying a welding current to the core members at the location of separation and in a manner to cause the current to flow in the core member of one assembly to the point of contact of the nodes and then to return by flowing in the core member of the other assembly to the location of separation, moving the assemblies as a unit and at a desired rate to progressively weld the nodes at the welding contact point, and flowing a cooling liquid through the closed channel of each assembly during the welding operation.

5. In welding apparatus for joining truss core panel components to each other by resistance welding, in combination, at least one pair of insulated electrodes each having a contact surface shaped to accommodate the particular component adapted to contact therewith, means associated with the electrodes for applying pressure to each component to maintain the same in engagement with the contact surface of its particular electrode, additional pressure means located beyond the electrodes, considering the direction of movement of the components through the apparatus, for bringing the components into contact at a point for welding purposes, clamping means adapted to securely engage the forward end of the welded truss core panel, means associated with the clamping means for admitting a cooling fluid to the channels provided by the components and which extend longitudinally for the length thereof, and traction mechanism for moving the clamping means and thus the components as a unit to progressively cause the components to contact at said welding contact point.

6. In welding apparatus for joining truss core panel components to each other by resistance welding, in combination, a pair of insulated electrodes arranged to form a top and a bottom electrode and extending to provide a contact surface shaped to accommodate the particular component adapted to contact therewith, rollers associated with the electrodes for applying pressure to the parts to maintain the components in engagement with the contact surface of its particular electrode, additional rollers located beyond the electrodes, considering the direction of movement of the components through the apparatus, for bringing the components into and maintaining contact at a point for welding purposes, traction means for moving the panel and components as a unit to progressively cause the components to contact at said welding contact point, and a dual purpose clamping member interposed between the welded truss core panel and the traction means for releasably connecting the panel with the traction means and for admitting a cooling fluid to the channels provided by the said components.

7. Welding apparatus for joining truss core panel components as defined by claim 6, additionally including impedance blocks of metal located between those rollers adapted respectively to have pressure contact with the components, and each said impedance block having relatively close association with its component during the welding operation.

8. In the welding of truss core sandwich panels of the type having as components a pair of core members and a top and bottom cover sheet and wherein the core members are approximately triangular in cross-section, the method which consists first in welding the two core members to each other to form a double core assembly having closed channels which are open at respective ends of said assembly and then in welding the top and the bottom cover sheets to the double core assembly to form a truss core sandwich, the latter welding operation including the steps of maintaining the cover sheets separated from the double core assembly at a location in advance of their respective welding contact points, applying pressure to the components at their welding contact points to cause the cover sheets to contact the nodes of the double core assembly, supplying a welding current to the components at the location of separation in a manner to cause said current to flow in the top cover sheet to its point of contact with the double core assembly and then return by flowing in the double core assembly to the said location of separation, and to also cause said current to flow in the bototm cover sheet to its point of contact with the double core assembly and then return by flowing in the double core assembly to said location of separation, moving the components as a unit and at a desired rate to progressively weld the nodes of the double core assembly to the cover sheets at the welding contact point, flowing a cooling liquid through the closed channels of the double core assembly in a direction opposite to the movement of the assembly, and spraying a cooling liquid onto the surface of the cover sheets during the welding operation.

9. In welding apparatus for joining truss core panel components such as a core member and a cover sheet to each other by resistance welding, in combination, a pair of insulated electrodes each having a contact surface to accommodate the particular component adapted to contact therewith, means associated with the electrodes, respectively, for applying pressure to each component to maintain the same in engagement with its particular contact surface, additional pressure means located beyond the electrodes, considering the direction of movement of the components through the apparatus, for bringing the components into contact at a forward point for welding purposes, traction means for moving the components as a unit to progressively cause the components to contact at said welding contact point, and said cover sheet having strips of copper adhered to that surface thereof opposite the surface having contact with an electrode and extending longitudinally of the cover sheet to provide for more equal distribution of the welding current and therefore more uniform welding results.

References Cited in the file of this patent
UNITED STATES PATENTS

| | | |
|---|---|---|
| 1,078,225 | Thomson | Nov. 11, 1913 |
| 1,254,411 | Kronenberg | Jan. 22, 1918 |
| 1,480,022 | Snodgrass | Jan. 8, 1924 |
| 2,747,064 | Van Pappeldam | May 22, 1956 |
| 2,821,619 | Rudd | Jan. 28, 1958 |
| 2,833,910 | Stanton et al. | May 6, 1958 |
| 2,857,503 | Rudd | Oct. 21, 1958 |